US012643576B2

(12) United States Patent
Hergeth et al.

(10) Patent No.: US 12,643,576 B2
(45) Date of Patent: Jun. 2, 2026

(54) METHOD FOR OPERATING AN ASSISTANCE SYSTEM OF AN AT LEAST TEMPORARILY AUTONOMOUSLY OPERABLE VEHICLE

(71) Applicant: Bayerische Motoren Werke Aktiengesellschaft, Munich (DE)

(72) Inventors: Sebastian Hergeth, Munich (DE); Frederik Naujoks, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 181 days.

(21) Appl. No.: 18/027,996

(22) PCT Filed: Aug. 30, 2021

(86) PCT No.: PCT/EP2021/073870
§ 371 (c)(1),
(2) Date: Mar. 23, 2023

(87) PCT Pub. No.: WO2022/063522
PCT Pub. Date: Mar. 31, 2022

(65) Prior Publication Data
US 2023/0339518 A1      Oct. 26, 2023

(30) Foreign Application Priority Data

Sep. 24, 2020     (DE) ..................... 10 2020 124 896.2

(51) Int. Cl.
*B60W 60/00*          (2020.01)
*B60W 40/08*          (2012.01)
*B60W 50/16*          (2020.01)
(52) U.S. Cl.
CPC ........ *B60W 60/0053* (2020.02); *B60W 40/08* (2013.01); *B60W 50/16* (2013.01);
(Continued)

(58) Field of Classification Search
CPC ........ B60W 60/0053; B60W 60/0057; B60W 40/08; B60W 50/16; B60W 2556/10; B60W 2555/20; B60W 2540/229; B60W 2540/26
See application file for complete search history.

(56) References Cited

U.S. PATENT DOCUMENTS

2018/0093675 A1*   4/2018  Holub ............... B60W 60/0059
2018/0339714 A1   11/2018  Smid et al.
(Continued)

FOREIGN PATENT DOCUMENTS

CN        107878466 A      4/2018
CN        110268451 A      9/2019
(Continued)

OTHER PUBLICATIONS

International Search Report (PCT/ISA/210) issued in PCT Application No. PCT/EP2021/073870 dated Dec. 23, 2021 with English translation (five (5) pages).
(Continued)

*Primary Examiner* — Steven Vu Nguyen
(74) *Attorney, Agent, or Firm* — Crowell & Moring LLP

(57)          ABSTRACT

An assistance system influences an asleep and/or awake state of a vehicle occupant to at least temporarily take over a vehicle guidance function by detecting the asleep and/or awake state of the vehicle occupant using a detection device to generate takeover capability information, detecting, receiving, and/or generating destination arrival information, at least temporarily influencing the asleep and/or awake state of the vehicle occupant by an influencing device, such that there is a defined minimum takeover capability of the vehicle occupant to take over a vehicle guidance function for
(Continued)

the vehicle occupant for at least a portion of the journey and/or travel time at least over a portion of the journey and/or travel time.

20 Claims, 3 Drawing Sheets

(52) U.S. Cl.
CPC ... B60W 60/0057 (2020.02); *B60W 2540/229* (2020.02); *B60W 2540/26* (2013.01); *B60W 2555/20* (2020.02); *B60W 2556/10* (2020.02)

(56) References Cited

U.S. PATENT DOCUMENTS

| | | | | |
|---|---|---|---|---|
| 2019/0357834 | A1* | 11/2019 | Aarts .................. | A61B 5/7246 |
| 2020/0198465 | A1* | 6/2020 | Tanabe .................. | B60N 2/143 |

FOREIGN PATENT DOCUMENTS

| | | |
|---|---|---|
| CN | 110770074 A | 2/2020 |
| DE | 10 2014 201 036 A1 | 7/2015 |
| DE | 10 2014 214 777 A1 | 1/2016 |
| DE | 10 2014 225 680 A1 | 6/2016 |
| DE | 10 2015 215 079 A1 | 2/2017 |
| DE | 10 2016 224 205 A1 | 6/2018 |
| DE | 10 2017 217 603 B3 | 3/2019 |
| DE | 10 2018 125 939 A1 | 4/2020 |

OTHER PUBLICATIONS

German-language Written Opinion (PCT/ISA/237) issued in PCT Application No. PCT/EP2021/073870 dated Dec. 23, 2021 (six (6) pages).

German-language Search Report issued in German Application No. 10 2020 124 896.2 dated Feb. 18, 2021 with partial English translation (11 pages).

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

Partial English translation of Chinese-language Office Action issued in Chinese Application No. 202180062695.4 dated Dec. 14, 2025, with Chinese-language Search Report (11 pages).

* cited by examiner

METHOD FOR OPERATING AN ASSISTANCE SYSTEM OF AN AT LEAST TEMPORARILY AUTONOMOUSLY OPERABLE VEHICLE

FIELD

The invention relates to a method for operating an assistance system of an at least temporarily autonomously operable vehicle for influencing an asleep or awake state of a vehicle occupant of the vehicle who comes into consideration to at least temporarily take over a vehicle guidance function.

BACKGROUND AND SUMMARY

Corresponding methods for operating an assistance system of a vehicle that can be operated autonomously at least temporarily for influencing an asleep and/or awake state of a vehicle occupant of the vehicle who comes into consideration to at least temporarily take over a vehicle guidance function are basically known from the prior art. It is generally known that autonomous driving or piloted driving of a vehicle allows the actual driver, at least for a short time, to be relieved of performing the vehicle guidance function or to have the vehicle guidance function performed by an assistance system. This is typically the case in the so-called autonomy levels 3 to 5 according to SAE J3016. This means, for example, that a vehicle occupant who is actually intended to be the driver can at least temporarily sleep or perform other activities while the vehicle is in motion.

If, in the event of a request to the vehicle occupant to take over the guidance function from the assistance system, particularly at short notice, the vehicle occupant does not reach a state of adequate capability to take over the guidance function quickly enough, this may result in a hazard for the occupant or other road users.

The invention addresses the problem of describing a method which, in particular with regard to a simple and fast as well as effective measure, allows the vehicle occupant the possibility of a sleep phase during the journey and at the same time reduces an accident risk for the vehicle occupant and other road users.

The problem is solved by a method for operating an assistance system of an at least temporarily autonomously operable vehicle for influencing an asleep or awake state of a vehicle occupant of the vehicle who comes into consideration to at least temporarily take over a vehicle guidance function according to the present disclosure. The present disclosure also relates to possible embodiments of the method and to a corresponding assistance system.

The invention relates to a method for operating an assistance system of an at least temporarily autonomously operable vehicle to influence an asleep or awake state of a vehicle occupant of the vehicle who comes into consideration to at least temporarily take over a vehicle guidance function, comprising the following method steps: (a) detecting the asleep and/or awake state of the vehicle occupant by means of a detection device in order to generate takeover capability information that describes a takeover capability of the vehicle occupant to take over a vehicle guidance function, (b) detecting and/or receiving and/or generating at least one item of destination arrival information that influences a route and/or travel time of the vehicle to arrive at a defined destination, (c) at least temporarily influencing the asleep and/or awake state of the vehicle occupant by means of an influencing device, such that there is a defined minimum takeover capability of the vehicle occupant to transfer a vehicle guidance function to the vehicle occupant for at least a portion of the route and/or travel time at least over a portion of the route and/or travel time, preferably over the majority of the route and/or travel time, particularly preferably over the entire route and/or travel time.

In this way, it is achieved that, on the one hand, it is basically possible for the vehicle occupant intended to at least temporarily guide the vehicle to fall asleep and, at the same time, there is a minimum takeover capability to take over the vehicle over at least part of the route, preferably for the majority of the route, particularly preferably for the entire route, so that the risk of an accident due to a vehicle occupant who is overtired and/or not transferred quickly enough from the asleep state to a sufficiently awake state to take over a vehicle guidance function is excluded or reduced. In other words, it is made possible for the vehicle occupant to enter an asleep state or to fall asleep at least in sections, but care is taken, for example, to ensure that the vehicle occupant does not enter REM or deep sleep during their sleep phase at least in sections, in particular throughout the entire journey. In this way, the capability of the vehicle occupant to take over is given priority over a maximum possible recovery through sleep phases during the journey, i.e., for example, a vehicle occupant is kept in a lighter sleep in order to keep their capability to take over temporally below a defined threshold value (e.g., for their reaction time out of the sleep phase). Thus, it may be an objective to increase the sustained attention and/or an arousal level (especially attention and reaction readiness) or to keep it at a minimum level.

The vehicle occupant of the vehicle who comes into consideration for the vehicle guidance function is the person who is intended to take over the vehicle guidance function from the assistance system in the event of a takeover request. The definition of one of several vehicle occupants as the person to whom the vehicle guidance function is to be transferred in the event of a necessary takeover can be made, for example, before the start of the journey or during the journey. The vehicle occupant responsible for taking over the vehicle guidance function can also be changed by the assistance system, in particular automatically. Information acquired by any detection devices and/or information introduced via input means can be taken into account here.

The detection device is set up to detect an asleep and/or awake state of the vehicle occupant and to evaluate and/or process and/or forward this detection information in such a way that takeover capability information relating to the capability of the vehicle occupant to take over a vehicle guidance function is created or generated. The takeover capability information can indicate the time period within which a sleeping vehicle occupant or a vehicle occupant in a wake-up phase is capable of adequately taking over the vehicle guidance function.

Before and/or after and/or during the detection of the asleep and/or awake state of the vehicle occupant by means of the detection device, a detection and/or a receipt and/or a generation of at least one piece of destination arrival information takes place. The destination arrival information has an influence on or comprises information about the route and/or travel time of the vehicle to reach a defined destination. For example, a destination is transferred or input to the assistance system, and a route and/or a travel time for reaching this destination is then determined or calculated. The destination information can also include traffic information, such as accident occurrence and/or traffic situation on the (calculated) route and/or weather information.

The vehicle occupant is influenced by the influencing device over a portion of the route and/or travel time, in particular over the majority of the route and/or travel time, in such a way that a defined minimum takeover capability of the vehicle occupant to take over a vehicle guidance function exists for the vehicle occupant for at least a portion of the route and/or travel time. In a preferred embodiment, the vehicle occupant is influenced in such a way that their minimum takeover capability to take over a vehicle guidance function is present for the majority of the route and/or travel time, in particular for the entire route and/or travel time to reach the destination.

In other words, depending on the current route planning, a planning is executed of possible route portions that allow a sleep phase, which allow the vehicle occupant to fall asleep or to sleep within certain or defined route portions. Thus, the assistance system provides the vehicle occupant with an offer for sleep options at least in sections or temporarily, depending on the destination arrival information (e.g. traffic situation and/or weather and/or the recovery state of the vehicle occupant). Thus, it is possible that the offer for temporary or section-based sleeping possibilities changes or is adapted during the journey due to a change in the traffic situation and/or due to perceived offers of sleeping possibilities and thus an increase in the takeover capability due to recovery that has already taken place.

It is possible that the minimum takeover capability (a) comprises a time period starting from a takeover signal transmitted to the vehicle occupant until the vehicle occupant takes over or performs the vehicle guidance function. For example, the minimum takeover capability may describe that a takeover of the vehicle guidance function by the sleeping or waking vehicle occupant takes place within a predefined threshold value (time amount) or a time period for achieving a state adequate for vehicle driving. The time period specifies a time interval within which the vehicle occupant has a minimum takeover capability to take over the vehicle guidance function after a wake-up signal or a vehicle takeover signal is emitted. In other words, the minimum takeover capability to take over or the time period can describe a maximum time (for example 2 seconds) allowed to the vehicle occupant within which the vehicle occupant has a sufficient capability to take over the vehicle guidance function. The threshold value can change depending on vehicle-occupant-specific circumstances/criteria during the journey. It is possible, for example, that the threshold value is lowered if the vehicle occupant has already performed a sleep phase during the journey and thus has a more recovered basic state, which allows them to be brought more quickly into a state suitable for vehicle guidance in a later and/or more current asleep event.

The minimum takeover capability may alternatively or additionally include a minimum takeover capability (i) based on a minimum reaction capability and/or (ii) based on a minimum state of wakefulness and/or (iii) based on a minimum visual capability and/or (iv) based on a minimum of a capability to guide a vehicle. For example, it is possible that the takeover capability and/or the minimum takeover capability comprises a minimum capability of a reaction time and/or of a wakefulness or an asleep state (i.e., deep sleep less wakefulness than in a light asleep state) and/or a visual capability. For example, the vehicle occupant requires a minimum time after waking up to achieve sufficient visual perception of the traffic situation and/or sufficient visual capability for a state adequate for vehicle guidance.

The influencing device can, for example, take into account time-of-day information and/or vehicle-occupantspecific, in particular historical, asleep- and/or awake-state information and/or vehicle-occupant-specific health information for at least temporarily influencing the asleep and/or awake state of the vehicle occupant. For example, the influencing device can perform an influencing of the vehicle occupant depending on the time of day or time-of-day information. For example, it can be provided that if a vehicle occupant "drives into the night", and thus the risk of deep sleep or REM asleep is increased, they experience a different type of influencing by the influencing device than if they drive in the vehicle in the early morning, well rested.

In this context, it is possible that the vehicle-occupant-specific, preferably historical, asleep- and/or awake-state information and/or the vehicle-occupant-specific health information is supplied, in particular manually, by the vehicle occupant and/or by a person differing from the vehicle occupant, in particular manually, via an input device to the influencing device or to an evaluation device operatively connected to the influencing device. Via a human machine interface, also referred to as an HMI interface, a vehicle occupant can consciously or unconsciously transmit to the assistance system information relating to the asleep and/or awake state and/or a state of health of this vehicle occupant. For example, a vehicle occupant can use a voice input to tell the assistance system how they last slept and/or what their state of health is before a journey is started or during the journey. Alternatively or additionally, the assistance system can use optical and/or haptic and/or thermal and/or acoustic sensors to detect the vehicle occupant themselves and/or their behavior within the vehicle (for example, their steering and/or reaction behavior) and can infer their state of being asleep and/or awake and/or their state of health.

The vehicle-occupant-specific, in particular historical, asleep- and/or awake-state information can comprise at least one account model in which events occurring over a period of time and influencing the asleep and/or awake state and/or detection results portraying the asleep and/or awake state are taken into account. An account model is to be understood here to be a software and/or an algorithm which makes it possible to receive a multitude of input information supplied in a temporally staggered manner and to issue output information, which considers the historical and/or temporal course, depending on predefined patterns and/or threshold values. The account model can distinguish information over a temporal course and at the same time can consider it additively and subtractively with regard to its influence on the tiredness of the vehicle occupant and/or with regard to its influence on the capability of the vehicle occupant to take over a vehicle guidance function. Preferably, the input information is weighted before or during its comparison with a threshold value. For example, the weighting of the particular input information can be performed in dependence on the time at which this information was introduced into the system and/or in dependence on the time at which this information was obtained or detected. Specifically, for example, older information regarding the sleep behavior of the vehicle occupant before the start of the journey can be weighted lower than more recent information acquired during the journey, which allows a conclusion to be drawn about the current tiredness of the vehicle occupant.

The destination arrival information can, for example, comprise (a) navigation information provided by a navigation system, in particular the route and/or the travel time, and/or (b) traffic information provided by a traffic system regarding the traffic volume, in particular route-specific traffic volume, and/or (c) weather information provided by a weather system, in particular route-specific weather information, and/or (d) vehicle status information provided by a vehicle status system and indicating the current and/or future status of the vehicle and/or (e) environment observation information provided by an environment observation system and relating to the immediate environment of the vehicle, in particular the traffic and/or the road surface, and/or (f) a traffic situation provided by a car-to-car interface or car-to-X interface, in particular specific to the route. Individual or all of the aforementioned information types can describe current and/or future events or conditions.

Traffic information may include, for example, the event of an accident and/or a route closure and/or the imminent overtaking of a heavy load. Weather information may include, for example, information about the type and extent of wind conditions and/or sunlight and/or precipitation or rain and/or hail or the like. The vehicle state information may comprise, for example, the technical state of a vehicle component of the vehicle. For example, the vehicle state information may comprise the tire pressure and/or the tire tread and/or the fill level of the fuel tank or the energy store of an at least partially electrically driven vehicle and/or the sound penetration characteristics of the passenger compartment (for example, due to open windows) and/or the state of wear of the engine and/or the temperature of the engine or the engine oil. The vehicle components provided here may have an influence on the acoustic and/or haptic perception of the vehicle for the vehicle occupant located in the passenger compartment. Thus, the consideration of these vehicle components can have a direct or indirect influence on the sleeping and/or waking behavior of the vehicle occupant, so that the consideration of these vehicle components is worthy of consideration for the planning of asleep and awake phases carried out by the assistance system and, in particular, the holding or bringing or assisting of a vehicle occupant into a defined sleep phase carried out by the influencing device.

The detection device can, for example, detect (a) the asleep and/or awake state of the vehicle occupant and/or (b) the state of health of the vehicle occupant by means of optical and/or haptic and/or thermal and/or acoustic sensors. In this context, the detection device may comprise, for example, a signal of the vehicle occupant that can be detected optically and/or haptically and/or thermally and/or acoustically and that is output consciously or unconsciously by the vehicle occupant. For example, acoustic sounds or signals emitted by the vehicle occupant typically during their sleep, such as snoring, and/or thermal signals, such as their body temperature at least in part, can be detected.

The influencing device can, for example, perform a temporary influencing that influences the asleep and/or awake state of the vehicle occupant by means of at least one optical and/or haptic and/or acoustic and/or thermal output means. In this case, the output means acts on the vehicle occupant in such a way that the output signal or the influencing signal of the at least one output means can be perceived by the vehicle occupant optically and/or haptically and/or acoustically and/or thermally, consciously and/or unconsciously. In this context, unconscious perception means that the vehicle occupant would perceive this signal in the awake state and that an unconscious reaction of the vehicle occupant to this signal occurs in the asleep state. The influencing device can also use several output means simultaneously or in a temporally staggered manner in order to achieve an influencing of the vehicle occupant.

In a preferred optional embodiment of the invention, it is provided that the influencing, in particular the intensity and/or the strength and/or the duration of the influencing, of the vehicle occupant who comes into consideration to temporarily take over the vehicle guidance function takes place in such a way that this vehicle occupant, at least in sections, in particular completely or over the entire journey, (a) remains in or reaches a weak or medium sleep phase and/or (b) does not reach a REM or deep-sleep phase. A weak or medium sleep phase means a range of sleep or a sleep phase in which the person is neither in an awake state nor in a deep-sleep state. Explicitly, the range of weak or medium sleep phase or weak or medium sleep depth may include a weaker sleep compared to REM or deep sleep and at the same time a more inattentive state compared to an awake state.

The sleep phases can be measured and visualized, for example, by deriving electrical voltage fluctuations at the surface of the head by means of electroencephalography (EEG) in different sleep rhythms. Depending on the sleep phase or sleep depth and the associated characteristic wave pattern, sleep can be divided into different stages. According to the frequency and amplitude of these "internal rhythms", a distinction is generally made between the following stages and the associated waves, wherein the following classification of sleep stages I-IV is known:

- (a) attentive: beta waves (14 to 30 Hz),
- (b) relaxed with eyes closed: alpha waves (8 to 13 Hz),
- (c) stage I (light sleep, shortly after falling asleep): the brain transitions from alpha waves to theta waves (4 to 7 Hz), wherein a conscious awareness of the environment slowly fades away,
- (d) stage II: in this phase, theta waves continue to occur, and are now joined by so-called sleep spindles and K-complexes,
- (e) stage III (transition to deep sleep): delta waves (0.1 to <4 Hz—slow waves with high amplitude) now come to the fore (20 to 50 percent of the measured brain waves),
- (f) stage IV (deep sleep): delta waves now account for more than 50 percent of measured brain waves, wherein a sleeper awakened during deep sleep appears disoriented and sleepy.
- (g) REM sleep: during REM asleep (rapid eye movement—also called dream asleep or paradoxical sleep) the EEG resembles the above-mentioned stage 1 (predominantly theta waves). During REM sleep, the skeletal muscles are maximally relaxed, but not the eye muscles. There is an activation of most vegetative functions with an increase in blood pressure, respiratory rate and heart rate, as well as increased release of the stress hormone adrenaline. For example, the blood pressure and/or the respiratory rate and/or the heart rate of the vehicle occupant can be recorded via the detection device and conclusions drawn from this as to which sleep phase they are in or which sleep phase they are not in.

According to this above classification into different sleep phases or stages, the light sleep phase can be understood as stage I and thus as light sleep, which occurs shortly after falling asleep. In this context, stage II and/or III can characterize a medium sleep or a medium sleep phase. Stage IV forms deep sleep, and therefore the asleep states not "allowed", or rather prevented by the assistance system preferably comprise sleep stage IV and/or REM asleep at least in sections of the route, preferably over the entire route.

In other words, the medium sleep phase forms an asleep state of a person in which this person, in comparison to REM sleep and/or to deep sleep, reaches an awake state, in particular a state of attentiveness enabling vehicle takeover, more quickly and/or in a more oriented manner.

It is possible for the route to be planned on the basis of the destination arrival information, wherein at least one sleep phase and at least one awake phase and at least one wake-up phase transitioning from the sleep phase to the awake phase are assigned to the route in sections. Suggestions for rest or sleep sections can be output, in particular displayed, to the vehicle occupant depending, for example, on route sections which can be determined or calculated in advance and which require the vehicle guidance function to be transferred from the assistance system to the vehicle occupant, or for which this requirement can be regarded as given to a certain degree of probability. Route and/or speed planning can also be carried out in such a way that the vehicle occupant has the opportunity to sleep at certain times or periods in order on the one hand to preferably arrive at the destination recovered to a certain extent and at the same time always have a minimum takeover capability to take over a section of the route or the entire route.

For example, it is possible, in particular by means of appropriate route planning, for at least two different sleep phases to be assigned to the route, which differ in terms of the intensity of the sleep and/or the duration for which a vehicle occupant acquires the capability to take over a vehicle guidance function. Thus, in a first route section a first sleep phase, and in a further route section different from the first route section a further sleep phase can be permitted or allowed as a maximum deep sleep phase by the influencing device. Thus, for example, it is possible for the vehicle occupant to enter a medium sleep phase in the first route section, and in a further route section the vehicle occupant can be prevented from entering a medium sleep phase by influencing the vehicle occupant accordingly by means of the influencing device. In this way, different degrees of sleep depth can be specified depending on the route section and monitored by the assistance system and executed by means of the influencing device by influencing the vehicle occupant accordingly.

For example, at least two different wake-up phases can be assigned to the route, which differ in terms of the intensity and/or strength and/or duration of the influence on the vehicle occupant to be woken up. It is thus possible for a first wake-up phase to be assigned to a first section of the route and for a further wake-up phase to be assigned to a further section of the route, wherein, for example, the duration of the wake-up phase accorded to the vehicle occupant is different. Depending on the degree to which the vehicle occupant is asleep or depending on the sleep phase they are in, a wake-up phase of different length can act on the vehicle occupant by the influencing device. Alternatively or additionally, depending on the type of sleep phase from which the vehicle occupant is to be brought out, a wake-up phase of different duration and/or intensity and/or strength of the influence can be carried out by the influencing device.

In addition to the method for operating an assistance system of an at least temporarily autonomously operable vehicle, the invention also relates to an assistance system of an at least temporarily operable vehicle for influencing an asleep and/or awake state of a vehicle occupant of the vehicle who comes into consideration to at least temporarily take over a vehicle guidance function, the assistance system being designed to carry out a method described herein. The invention also relates to a vehicle, in particular a motor vehicle, comprising an assistance system described herein. In this context, the vehicle is a vehicle driving autonomously at least in phases.

All advantages, details, embodiments and/or features of the method according to the invention are transferable or applicable to the assistance system according to the invention and to the vehicle according to the invention.

The invention is explained in greater detail by means of exemplary embodiments in the drawings.

DETAILED DESCRIPTION

Figure 1:
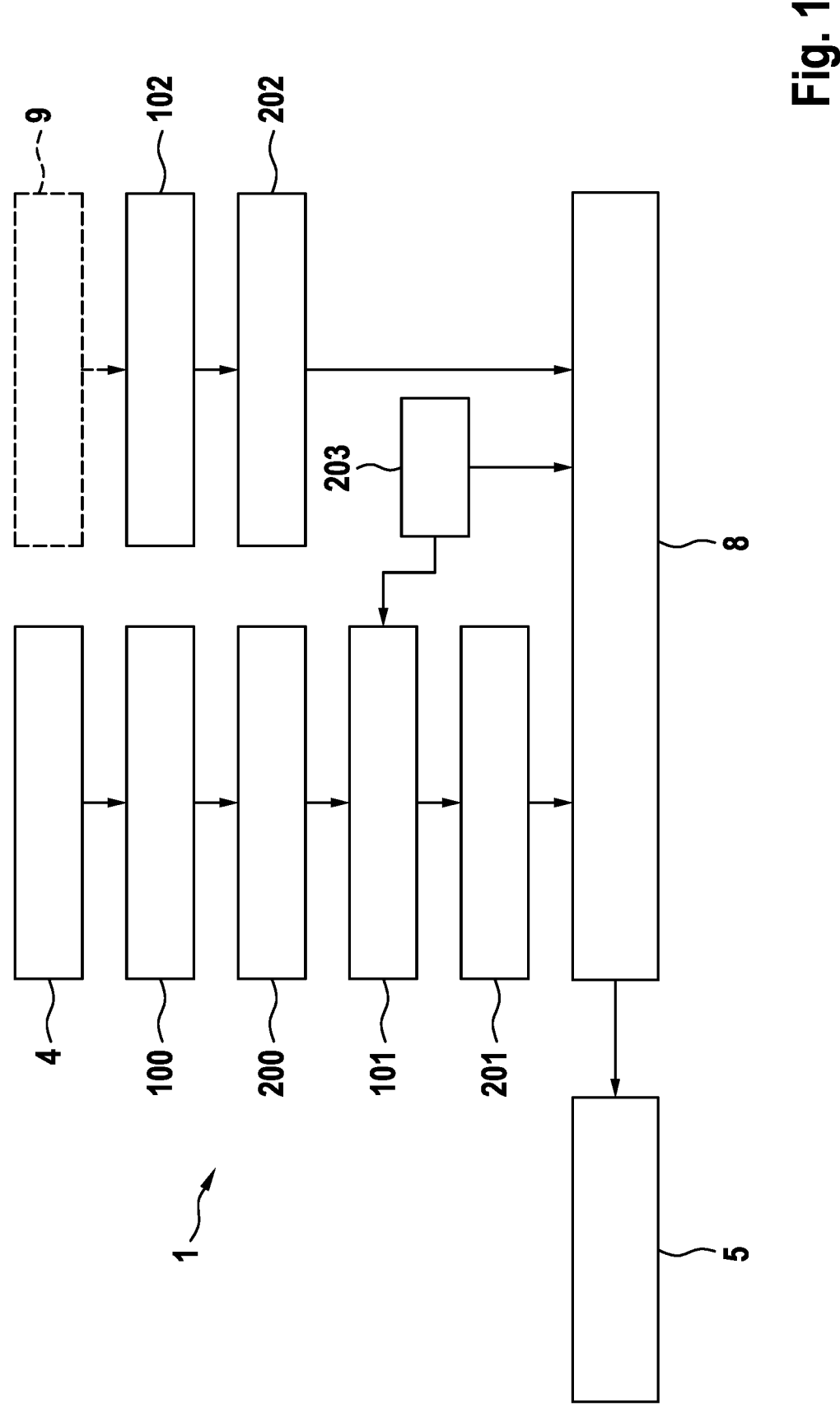
FIG. 1 shows a schematic diagram of the method for operating an assistance system of an at least temporarily operable vehicle according to an exemplary embodiment.
Figure 2:
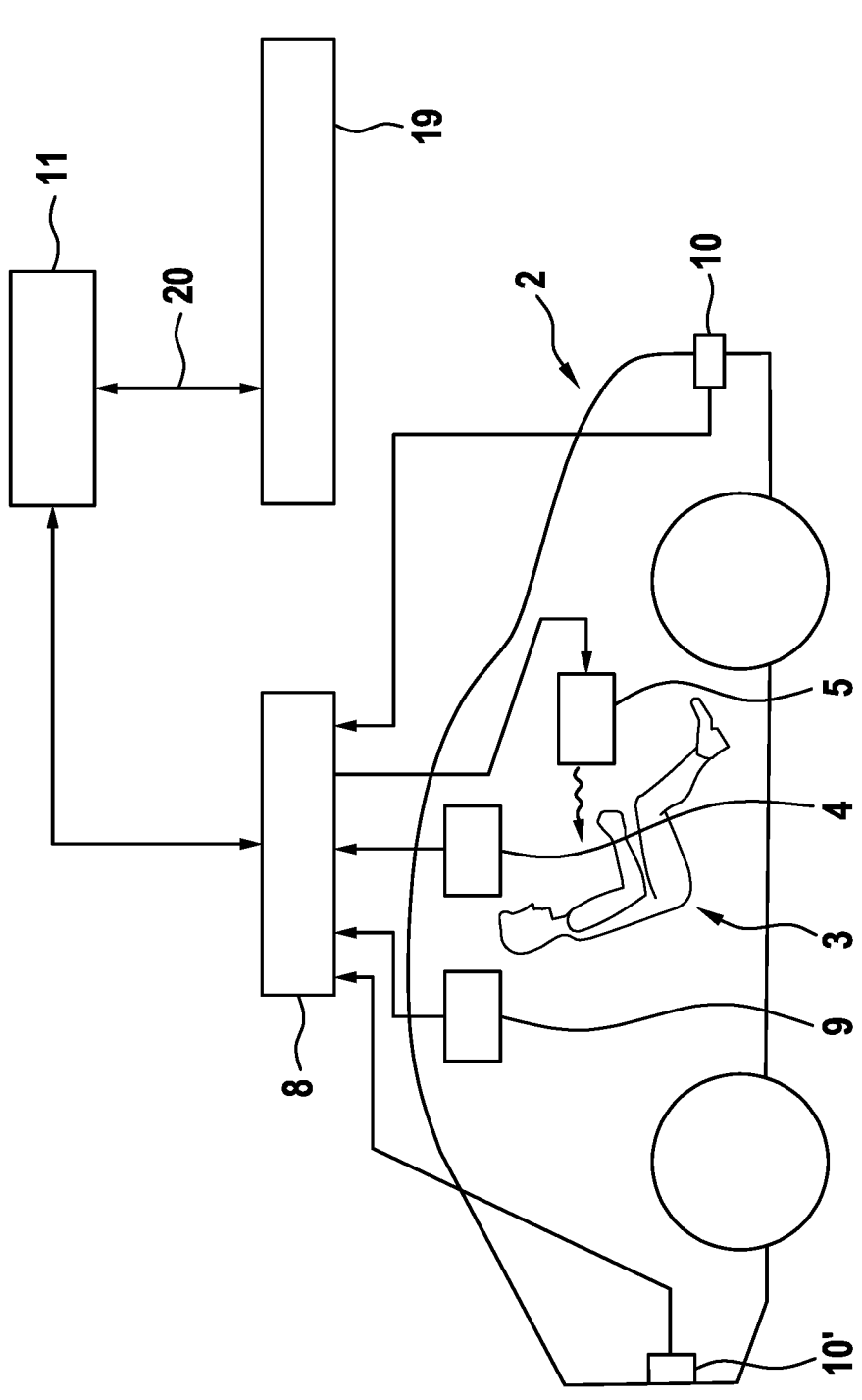
FIG. 2 shows a schematic diagram of a vehicle equipped with an assistance system according to an exemplary embodiment.

In accordance with FIG. 1, a method of an assistance system 1 of an at least temporarily autonomously operable vehicle 2 for influencing an asleep and/or awake state of a vehicle occupant 3 of the vehicle 2 who comes into consideration to at least temporarily take over a vehicle guidance function will be described hereinafter. Here, the method comprises the following method steps: (a) detecting 100 the asleep and/or awake state of the vehicle occupant 3 by means of a detection device 4 for generating 101 takeover capability information 201 describing a takeover capability of the vehicle occupant 3 to take over a vehicle guidance function. The takeover capability information 201 is based here at least on the asleep- and/or awake-state information 200 detected or generated by the detection device 4. Furthermore, at least one piece of destination arrival information 202 is detected and/or received and/or generated 102 and has an influence on a route 6 and/or on a travel time of the vehicle 2 for reaching a defined destination 7. In this case, the asleep and/or awake state of the vehicle occupant 3 is at least temporarily influenced by means of an influencing device 5 on the basis of the takeover capability information 201 and the destination arrival information 202, such that there is a defined minimum takeover capability of the vehicle occupant 3 to transfer a vehicle guidance function to the vehicle occupant 3 for at least a portion of the route 6 and/or travel time at least over a portion of the route 6 and/or travel time, preferably over the majority of the route 6 and/or travel time, particularly preferably over the entire route 6 and/or travel time.

The minimum takeover capability can, for example, comprise (a) a maximum takeover period starting from a takeover signal (not shown) transmitted or output to the vehicle occupant 3 until the vehicle occupant 3 takes over or performs the vehicle guidance function and/or (b) a minimum capability based on a minimum reaction capability and/or based on a minimum state of wakefulness and/or minimum asleep state and/or based on a minimum visual capability and/or based on a minimum, in particular physical and/or mental, capability for guiding a vehicle. An evaluation device 8 can be used to evaluate the destination arrival information 202, for example the route 6 still to be traveled and any factors influencing the journey along the route (such as traffic volume and/or vehicle state or the state of individual vehicle units or components) in order to determine control data for actuating the influencing device 5. The evaluation can, for example, be carried out in such a way that a minimum level of capability or responsiveness, for example a minimum duration of a time period from a takeover request to adequate takeover of the vehicle guidance function by the vehicle occupant, is provided.

When influencing the vehicle occupant 3, the influencing device 5 can take into account, for example, time-of-day information and/or vehicle-occupant-specific, in particular historical, sleep- and/or awake-state information 200 and/or vehicle-occupant-specific health information 203 for at least temporarily influencing the sleep and/or awake state of the vehicle occupant 3. For example, health information 203 may comprise information relating to the health of the vehicle occupant 3, such as the presence of a chronic or temporary illness, such as a fever. Alternatively or additionally, the health information 203 may comprise the taking of a temporary medication and/or a permanent medication. In this regard, the health information 203 may be used, for example, to enable a more suitable detection of the asleep and/or awake state of the vehicle occupant 3 via the detection device 4 and/or a more suitable interpretation of detected data of the vehicle occupant 3 and/or a more effective influencing of the vehicle occupant 3 by means of the influencing device 5. For example, in the case of a vehicle occupant 3 who has taken a medicament that lowers the body temperature, this effect of the medicament can be taken into account when evaluating a detected body temperature to obtain asleep- and/or awake-state information 200 and/or to obtain takeover capability information 201.

Even if the vehicle occupant has had a strenuous day at work before starting the journey and/or was engaged in a sporting activity, this information can be taken into account as health information 203 in the determination of the takeover capability information 201 and/or in the control of the influencing device 5.

In deviation from the representation of FIG. 1, the health information can also be included in the evaluation of the detected asleep and/or awake state and thus be taken into account in the determination of the takeover capability information 201.

The vehicle-occupant-specific, preferably historical, asleep- and/or awake-state information 200 and/or the vehicle-occupant-specific health information 203 can, for example, be supplied, in particular manually, to the influencing device 5 by the vehicle occupant 3 and/or by a person differing from the vehicle occupant 3, in particular manually, via an input device 9 or by the detection device 4. Alternatively or additionally, the information of the input device 9 and/or the detection device 4 can be supplied to an evaluation device 8 which is operatively connected to the influencing device 5. Alternatively or additionally, the input device 9 can also be used to introduce destination arrival information 202 or a component of destination arrival information 202 of the influencing device 5 or of an evaluation unit 8 operatively connected to the influencing device 5.

The vehicle-occupant-specific, in particular historical, asleep- and/or awake-state information 200 can, for example, comprise at least one account model (not shown) in which events occurring over a period of time and influencing the asleep and/or awake state and/or detection results portraying the asleep and/or awake state are taken into account. Depending on the events taken into account in the account model additively or subtractively over the temporal course of observation, a current and/or a predicted future takeover capability of the vehicle occupant 3 can be determined and/or a minimum takeover capability of the vehicle occupant 3 at a current and/or a future time can be derived. Building on this actual or fictitious takeover capability value or minimum takeover capability value, the influencing device 5 can be controlled depending on the destination arrival information 202, in particular on the route 6 and the traffic situation.

The destination information 202 can, for example, comprise (a) navigation information provided by a navigation system (not shown), in particular the route (6) and/or travel time, and/or (b) traffic information provided by a traffic system regarding the traffic volume, in particular route-specific traffic volume, and/or (c) weather information provided by a weather system, in particular route-specific weather information, and/or (d) vehicle status information provided by a vehicle status system and indicating the current and/or future status of the vehicle, in particular vehicle characteristic values or vehicle operating means, and/or (e) environment observation information provided by an environment observation system 10, 10' and relating to the immediate environment of the vehicle 2, in particular the traffic and/or the road surface, and/or (f) a traffic situation provided by a car-to-car interface 11 and/or car-to-X interface, in particular specific to the route. The car-to-car interface 11 can be connected to a further vehicle 19 for data exchange via a data link 20, in particular a wireless data link 20.

The detection device 4 can, for example, detect the asleep and/or awake state of the vehicle occupant 3 and/or the state of health of the vehicle occupant 3 by means of optical and/or haptic and/or thermal and/or acoustic sensors.

The influencing device 5 can, for example, temporarily influence the asleep and/or awake state of the vehicle occupant 3 by means of at least one optical and/or haptic and/or acoustic and/or thermal output means. For example, the output means of the influencing device 5 is designed as a temperature-control element (heating and/or cooling element) installed in particular in or on a vehicle seat and/or in or on an interior ventilation system. Alternatively or additionally, the output means can be formed as a vibration element which is arranged or formed in or on a vehicle seat and/or in or on a steering wheel and/or in or on an accelerator pedal and/or in or on an armrest and/or in or on a head and/or neck support. The output means can also be formed alternatively or additionally as a lighting means and/or as a loudspeaker, so that light and/or sound signals can be transmitted to the vehicle occupant.

The influencing, in particular the intensity and/or the strength and/or the duration of the influencing, of the vehicle occupant 3 who comes into consideration or is intended to temporarily take over the vehicle guidance function can take place in such a way that this vehicle occupant 3 at least in sections, in particular completely, (a) remains in or reaches a weak or medium sleep phase and/or (b) does not reach a REM or deep-sleep phase or remains there only briefly.

The medium sleep phase can describe, for example, an asleep state of a vehicle occupant 3 in which the vehicle occupant 3 enters an awake state, in particular a state of attentiveness enabling vehicle takeover, more quickly and/or in a more oriented manner compared to REM asleep and/or deep sleep.

Based on the destination arrival information 202, for example, planning of the route 6, in particular automated planning, can be carried out, wherein at least one sleep phase 12, 13 and at least one awake phase 14, 15 and at least one wake-up phase 16, 17 transitioning from the sleep phase 12, 13 to the awake phase 14, 15 are assigned to the route 6 in sections. Thus, in addition to the sleep phase 12, 13 and the awake phase 14, 15, a wake-up phase 16, 17 defining or controlling the transition from the sleep phase 12, 13 to the awake phase 14, 15 is taken into account or specifically influenced by the assistance system 1. The wake-up phase 16, 17 can be designed differently with regard to the influencing of the vehicle occupant 3 by the influencing device 5 during this phase depending on the type and/or scope (for example duration) of the at least one preceding sleep phase 12, 13, in particular effectively used by the vehicle occupant 3, and/or depending on vehicle-occupant-specific information (e.g. state of health, wake-up habits and the like). In this way, for example, the fastest possible and/or a predictable wake-up phase 16, 17 for the vehicle occupant 3 in question, in particular for the vehicle occupant 3 taking over the vehicle guidance function, can be made possible by a control of the influencing device 5 adapted to this.

Figures 3A, 3B, 3C:
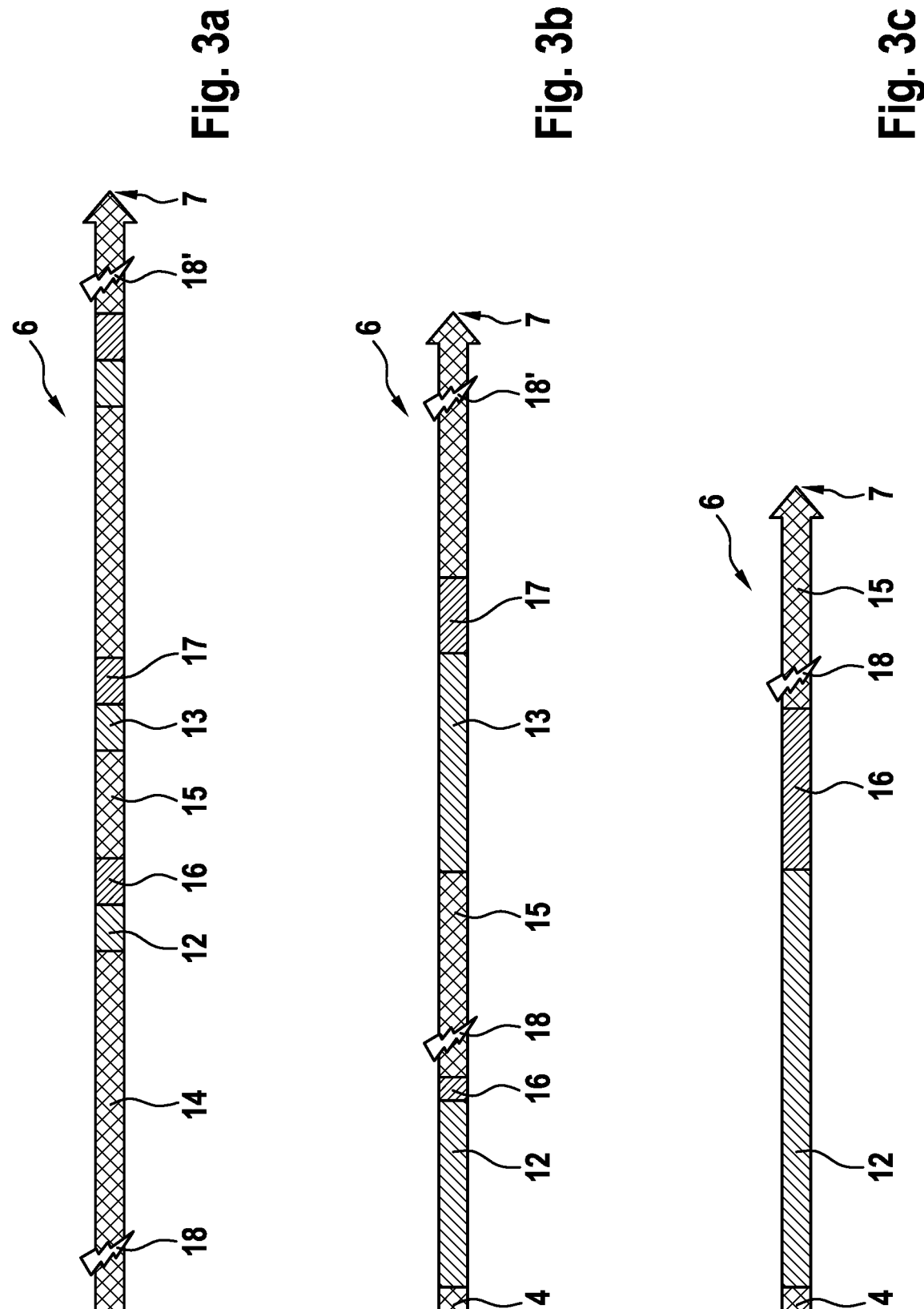
FIGS. 3a, 3b, and 3c show a schematic diagram of different awake and sleep phases proposed by an assistance system for a journey of the same route according to an exemplary embodiment.

As shown in FIGS. 3a to 3c, at least two different sleep phases 12, 13 can be assigned in sections to a route 6 leading to a destination 7 or to a selected route 6, which sleep phases differ in the intensity of the sleep and/or the time it takes to reach a takeover capability for taking over a vehicle guidance function by a vehicle occupant 3 or the effectively necessary wake-up phase 16, 17 for the vehicle occupant 3 to acquire a sufficient takeover capability for taking over the vehicle guidance function. The length of the phases shown in FIGS. 3a to 3c indicate their temporal course. For example, the start time for the journey according to FIG. 3a is at 07:00 in the morning, i.e. at a time when the vehicle occupant or driver has recently got up and consequently has a longer restful sleep phase behind them. Thus, the assistance-system-side planning comprises a major part of awake phases 14, 15, since the vehicle occupant 3 initially has no need for sleep, since they start the journey already in a well-rested state. An arrival at the destination 7 can take place in the example according to FIG. 3a at 11:00, whereby the travel time amounts to a total of 4 hours.

The different phases 12, 13, 14, 15, 16, 17 are indicated in the figures by different hatching. Thus, the awake phases 14, 15 are visualized by cross-hatching, the sleep phases 12, 13 by slanted hatching with a gradient from the lower left to the upper right, and the wake-up phases 16, 17 by slanted hatching with a gradient from the upper left to the lower right.

In the example according to FIG. 3b, the same route is taken as in the example in FIG. 3a, but the start of the journey or departure according to FIG. 3b is at 13:00, after lunch. Due to the previous meal, a sleep phase 12, in particular a planned one, is provided relatively early after the start of the journey. Due to the lower traffic volume, the destination is reached at 16:30, resulting in a shortened travel time of 3.5 hours compared to the example in FIG. 3a.

The example according to FIG. 3c also shows a journey along the same route 6 as in the two aforementioned examples (according to FIGS. 3a and 3b), wherein the journey begins at 21:00, and thus after a working day. The vehicle occupant 3 exhibits fatigue due to the late departure time as well as the past exertion of the working day and thus a correspondingly high need for rest. The traffic situation requires a takeover request 18 in order to transfer the guidance of the vehicle to the vehicle occupant 3. Due to the fatigue or lack of rest of the vehicle occupant 3, the planned wake-up phase 16 and/or the wake-up phase 16 executed by the assistance system 1 lasts for longer than in the examples of FIGS. 3a and 3b. This is due to the fact that the vehicle occupant 3 requires more time to perform a vehicle guidance function after being woken up by the influencing device 5, due to the higher level of fatigue experienced by the vehicle occupant 3 and the longer and/or deeper sleep phase 12 preceding the wake-up phase 16. Thus, (a) depending on the time of day and/or (b) depending on the type and/or extent of the, in particular immediately, preceding planned sleep phase 12, 13 and/or (c) depending on the type and/or extent of the, in particular immediately, preceding actual sleep phase 12, 13, the assistance system 1 can differently design or adapt the type and/or extent (i.e., for example duration) of the subsequent wake-up phase 16, 17. The destination 7 is reached at 23:45 in the journey according to the example in FIG. 3c (journey time: 2.75 hours), since the traffic volume allows correspondingly faster progress than in the afore-mentioned examples according to FIGS. 3a and 3b.

As shown in the example according to FIG. 3b, at least two different wake-up phases 16, 17 can be assigned to a route 6, which differ in their intensity and/or strength and/or duration of the influence on the vehicle occupant 3 to be woken up. For example, the first wake-up phase 16 shown in FIG. 3b can be kept short in time, since, for example, the vehicle occupant 3 has to take over the vehicle guidance function surprisingly quickly. The second wake-up phase 17 is longer in time than the first wake-up phase 16 in order to allow a gentler wake-up process that is more pleasant for the vehicle occupant.

The examples shown in FIGS. 3a to 3c thus demonstrate that different conditions can exist during the journey over the same route and that the takeover capability of the vehicle occupant for taking over the journey can be optimized by targeted planning and implementation of (potential) sleep phases. In this case, the planning and implementation can be dynamically adjusted, for example, if premise changes such as unplanned takeover requirements occur during the journey. It can be provided that the assistance system acts on the vehicle occupant in such a way that optimal scheduling or planning of REM and non-REM sleep phases is achieved, so that the takeover capability of the driver in the event of a planned takeover is as high as possible.

In addition to the method described herein, the present disclosure also relates to an assistance system 1 of an at least temporarily operable vehicle 2 for influencing an asleep and/or awake state of a vehicle occupant 3 who comes into consideration to at least temporarily take over a vehicle guidance function, wherein the vehicle 2 is designed to carry out the method described herein. Lastly, the present disclosure also relates to a vehicle 2, in particular a motor vehicle, comprising such an assistance system 1.

LIST OF REFERENCE SIGNS 1 assistance system
2 vehicle
3 vehicle occupant
4 detection device
5 influencing device
6 route
7 destination
8 evaluation device
9 input device
10, 10' environment observation system
11 car-to-car interface
12 first sleep phase
13 further sleep phase
14 first awake phase
15 second awake phase
16 first wake-up phase
17 further wake-up phase
18, 18' takeover request
19 further vehicle
20 data link
100 detection of the asleep and/or awake state of 3

101 generation of 201
102 detection and/or receipt and/or generation of 202
200 asleep- and/or awake-state information
201 takeover capability information
202 destination arrival information
203 health information

The invention claimed is:

1. A method for operating an assistance system of an at least temporarily autonomously operable vehicle for influencing an asleep and/or awake state of a vehicle occupant of the vehicle who comes into consideration to at least temporarily take over a vehicle guidance function, the method comprising:
    detecting the asleep and/or awake state of the vehicle occupant by a detection device to generate takeover capability information that describes a takeover capability of the vehicle occupant to take over the vehicle guidance function;
    at least one of detecting, receiving, and/or generating at least one item of destination arrival information that influences a route and/or a travel time of the vehicle to arrive at a defined destination, wherein the route includes at least one sleep phase, at least one awake phase, and at least one wake-up phase transitioning from the sleep phase to the awake phase to the route in sections; and
    at least temporarily influencing the asleep and/or awake state of the vehicle occupant by an influencing device during the at least one sleep phase, such that there is a defined minimum takeover capability of the vehicle occupant during the at least one sleep phase to transfer the vehicle guidance function to the vehicle occupant and the vehicle occupant remains neither in an awake state nor in a deep-sleep state,
    wherein the at least temporarily influencing the asleep and/or awake state of the vehicle occupant during the at least one sleep phase further comprises accounting for vehicle-occupant-specific information, wherein the vehicle-occupant-specific information comprises historical asleep- and/or awake-state information of the vehicle occupant.

2. The method according to claim 1, wherein the minimum takeover capability comprises:
    a time period starting from a takeover signal transmitted to the vehicle occupant until the vehicle occupant takes over or performs the vehicle guidance function; and/or
    a minimum capability based on at least one of a minimum reaction capability, a minimum state of wakefulness, a minimum sleep state, a minimum visual capability, and/or a minimum of a capability to guide a vehicle.

3. The method according to claim 1, wherein the at least temporarily influencing the asleep and/or awake state of the vehicle occupant further comprises accounting for time-of-day information.

4. The method according to claim 1, wherein the vehicle-occupant-specific information comprises vehicle-occupant-specific health information of the vehicle occupant.

5. The method according to claim 1, wherein the destination arrival information comprises at least one of:
    navigation information provided by a navigation system further comprising at least one of the route and/or travel time;
    traffic information provided by a traffic system regarding a route-specific traffic volume;
    weather information provided by a weather system;
    vehicle status information provided by a vehicle status system and indicating a current and/or future status of the vehicle;
    environment observation information provided by an environment observation system and relating to an immediate environment of the vehicle; and/or
    a traffic situation provided by a car-to-car interface or car-to-X interface.

6. The method according to claim 1, further comprising:
    detecting the asleep and/or awake state of the vehicle occupant and/or a state of health of the vehicle occupant by the detection device using at least one of optical, haptic, thermal, and/or acoustic sensors.

7. The method according to claim 1, further comprising:
    performing, by the influencing device, a temporary influencing that influences the asleep and/or awake state of the vehicle occupant using at least one of an optical, haptic, acoustic, and/or thermal output device.

8. The method according to claim 1, further comprising:
    adjusting an intensity, strength, and/or duration of the influencing of the asleep and/or awake state of the vehicle occupant such that the vehicle occupant, at least the portion of the route and/or travel time remains in or reaches a weak or medium sleep phase, and/or avoids reaching a REM or deep-sleep phase.

9. The method according to claim 8, wherein the medium sleep phase comprises an asleep state of the vehicle occupant in which the vehicle occupant reaches an awake state a state of attentiveness enabling vehicle takeover more quickly and/or in a more oriented manner in comparison to REM asleep and/or to deep sleep.

10. The method according to claim 1, further comprising:
    planning the route on a basis of the destination arrival information; and
    assigning the at least one sleep phase, the at least one awake phase, and the at least one wake-up phase transitioning from the sleep phase to the awake phase to the route in sections.

11. The method according to claim 1, further comprising:
    at least temporarily influencing the asleep and/or awake state of the vehicle occupant by the influencing device, such that there is the defined minimum takeover capability of the vehicle occupant to transfer the vehicle guidance function to the vehicle occupant for an entirety of the route and/or travel time.

12. An assistance system of an at least temporarily autonomously operable, comprising:
    a detection device comprising at least one sensor configured to detect an asleep and/or awake state of a vehicle occupant to generate takeover capability information that describes a takeover capability of the vehicle occupant to take over a vehicle guidance function;
    an influencing device comprising at least one of an optical, haptic, acoustic, and/or thermal output device configured to influence the asleep and/or awake state of the vehicle occupant; and
    at least one processor configured to:
        receive the takeover capability information from the detection device;
        at least one of detect, receive, and/or generate at least one item of destination arrival information that influences a route and/or a travel time of the vehicle to arrive at a defined destination, wherein the route includes at least one sleep phase, at least one awake phase, and at least one wake-up phase transitioning from the sleep phase to the awake phase to the route in sections;

control the influencing device to at least temporarily influence the asleep and/or awake state of the vehicle occupant by the influencing device during the at least one sleep phase, such that there is a defined minimum takeover capability of the vehicle occupant during the at least one sleep phase to transfer the vehicle guidance function to the vehicle occupant and the vehicle occupant remains neither in an awake state nor in a deep-sleep state; and control the influencing device to at least temporarily influence the asleep and/or awake state of the vehicle occupant during the at least one sleep phase by accounting for vehicle-occupant-specific information, wherein the vehicle-occupant-specific information comprises historical, asleep- and/or awake-state information of the vehicle occupant.

13. The assistance system according to claim 12, wherein the minimum takeover capability comprises:

a time period starting from a takeover signal transmitted to the vehicle occupant until the vehicle occupant takes over or performs the vehicle guidance function; and/or a minimum capability based on at least one of a minimum reaction capability, a minimum state of wakefulness, a minimum sleep state, a minimum visual capability, and/or a minimum of a capability to guide a vehicle.

14. The assistance system according to claim 12, wherein the at least one processor is further configured to at least temporarily influence the asleep and/or awake state of the vehicle occupant by accounting for time-of-day information.

15. The assistance system according to claim 12, wherein the vehicle-occupant-specific information comprises vehicle-occupant-specific health information of the vehicle occupant.

16. The assistance system according to claim 12, wherein the destination arrival information comprises at least one of:

navigation information provided by a navigation system further comprising at least one of the route and/or travel time;

traffic information provided by a traffic system regarding a route-specific traffic volume;

weather information provided by a weather system;

vehicle status information provided by a vehicle status system and indicating a current and/or future status of the vehicle;

environment observation information provided by an environment observation system and relating to an immediate environment of the vehicle; and/or a traffic situation provided by a car-to-car interface or car-to-X interface.

17. The assistance system according to claim 12, wherein the at least one sensor comprises at least one of an optical, haptic, thermal, and/or acoustic sensor configured to detect the asleep and/or awake state of the vehicle occupant and/or a state of health of the vehicle occupant.

18. The assistance system according to claim 12, wherein the at least one of an optical, haptic, acoustic, and/or thermal output device is configured to perform a temporary influencing that influences the asleep and/or awake state of the vehicle occupant.

19. The assistance system according to claim 18, wherein the at least one processor is further configured to:

adjust an intensity, strength, and/or duration of the influencing of the asleep and/or awake state of the vehicle occupant such that the vehicle occupant, at least the portion of the route and/or travel time remains in or reaches a weak or medium sleep phase, and/or avoids reaching a REM or deep-sleep phase.

20. The assistance system according to claim 19, wherein the medium sleep phase comprises an asleep state of the vehicle occupant in which the vehicle occupant reaches an awake state a state of attentiveness enabling vehicle takeover more quickly and/or in a more oriented manner in comparison to REM asleep and/or to deep sleep.

* * * * *